INVENTORS.
BRUCE T. SCOTT
KENNETH E. SCOTT

Pearce and Scheepertklaus
ATTORNEYS

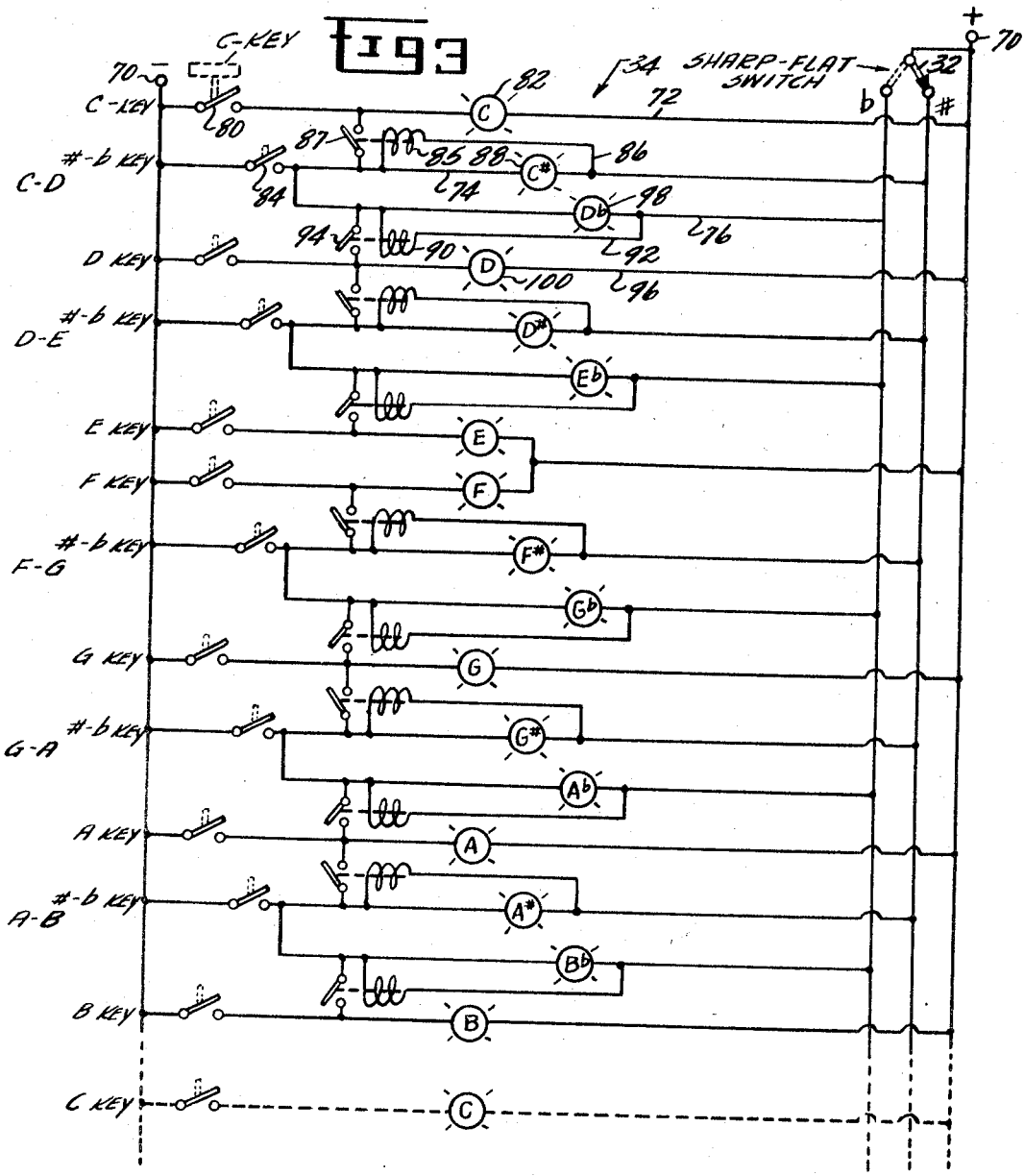

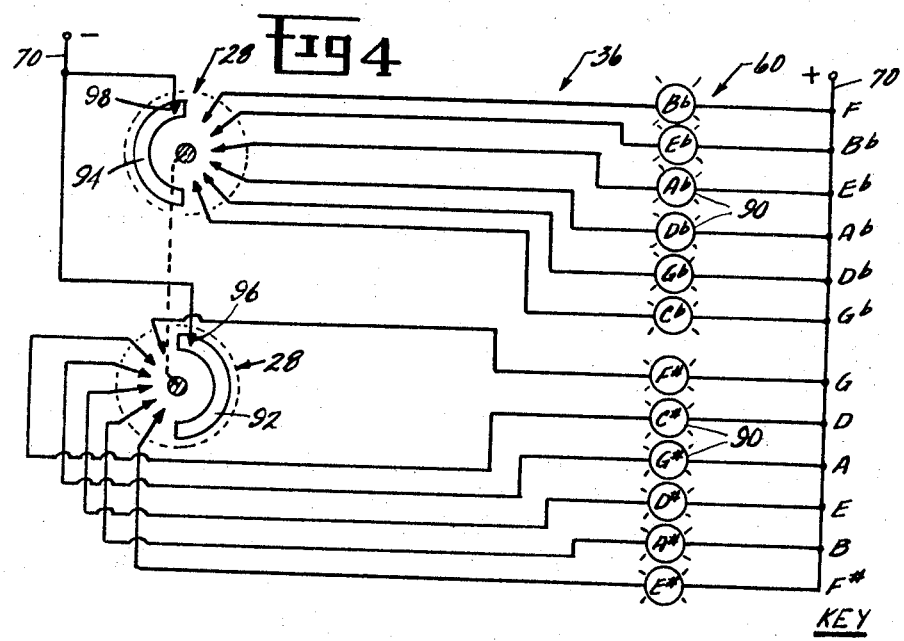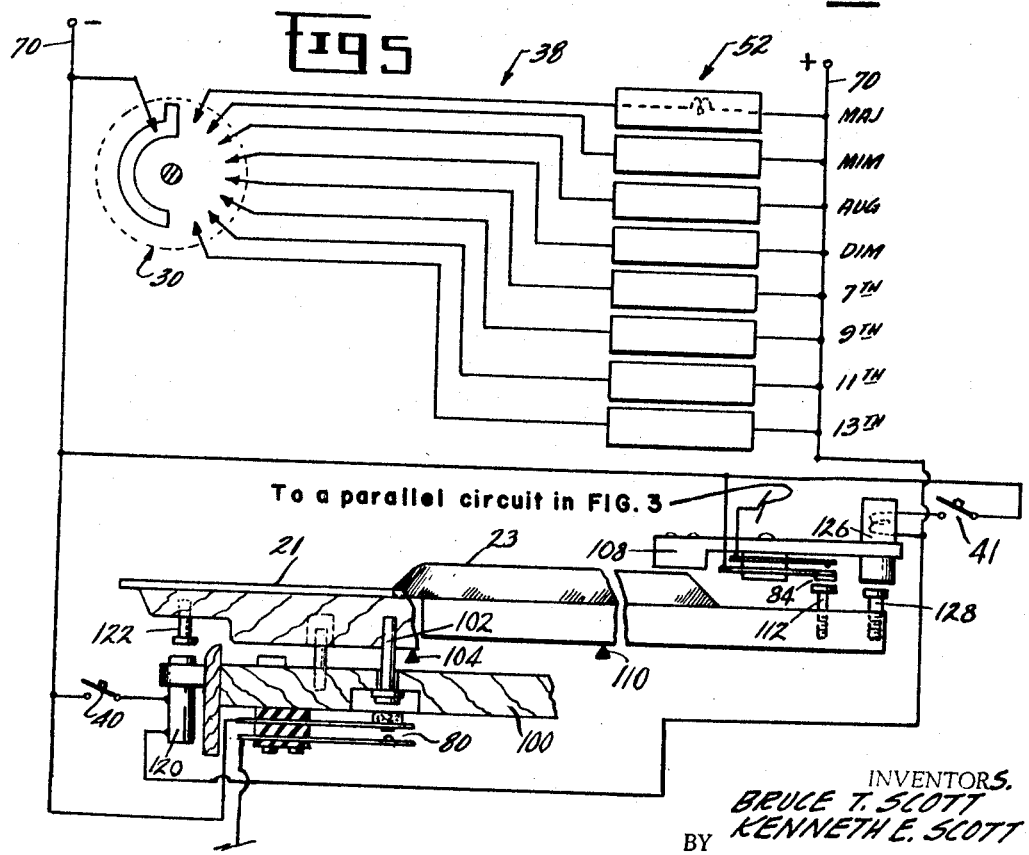

United States Patent Office 3,446,109
Patented May 27, 1969

3,446,109
AUDIO-VISUAL MUSIC SIMULATOR APPARATUS
Bruce T. Scott, Union Township, Brown County, Ohio
(433 Main St., Ripley, Ohio 45167), and Kenneth E.
Scott, Green Township, Hamilton County, Ohio
(3136 Balsamridge Drive, Cincinnati, Ohio 45239)
Filed Jan. 9, 1967, Ser. No. 608,039
Int. Cl. G09b 15/08
U.S. Cl. 84—478                         6 Claims

ABSTRACT OF THE DISCLOSURE

An audio-visual music simulating system comprising a panel simulating musical notation in multiple sections thereon and a master control board therewith, simulation of the notation on the sections of the panel being controlled by both instructor and student independently playing their respective piano keys or keys of other musical instruments to which the panel and board are adaptable, the master control board being controlled by the instructor alone. The simulating panel includes in its sections key signatures, designation of chords, and notes corresponding to keys played on the instruments. In cooperation with an electrical system, musical notation is simulated on the simulating board. Both audible and visual reproductions provide answers to instructor and student(s).

BACKGROUND OF THE INVENTION

*Description of the prior art*

Musical teaching apparatus, of the type involved here, are disclosed in the following U.S. Patent Nos. 972,934; 1,324,276; 1,613,400; 3,124,028; and 3,165,967.

SUMMARY

Our invention combines a number of features into an audio-visual apparatus whereby a student(s) becomes cognizant of theories of music and harmony and/or correct or incorrect play of the student in the event he is learning to play the involved instrument. The instructor sets into a master control board the particular key signature and/or chord designation (or major or minor modes) that a student is bound by, in order to learn such theories or to correctly play. The key signature and chord designation corresponding to that set into the master control board appear on a simulating panel displayable before the student in an instructor's section thereof. Thereafter, keys played by either instructor or student are simulated as notes on musical staffs included in the instructor's or student's section of the simulating panel, via energization of an electrical system associated with the keys of the instrument and the panel.

In teaching theories of music and harmony with the instant apparatus, it is not necessary for a student to perform on his keyboard the like play of an instructor who nevertheless can utilize the simulating panel.

The instructor may play prior to play on the student's keyboard, the student following in his effort to simulate notes in his section of the panel corresponding to the set indicated in the instructor's section of the simulating panel.

In the case of a learning student playing first on his keyboard, the simulated notes in his section of the simulating panel will visually indicate what keys have been played. If necessary, the instructor indicates to the student that his play is correct either by an audible answer or by playing on his keyboard a like corresponding set of keys which are then simulated in the instructor's section of the panel. If an incorrect set of keys has been played by the student, the correct set of notes simulated in the instructor's section indicates to the student what keys should have been played.

It will also become apparent, with the benefit of the accompanying disclosure, that the apparatus is advantageous for instruction in theories of music and in learning harmony, in addition to utilization for instruction in an instrument such as the piano. In other words, the device is also useful for obtaining musical knowledge in which intervals of time is not of immediate importance.

An object of this invention, therefore, is to provide for a novel apparatus for teaching music to beginning players and to other beginning musical performers such as singers, harmony groups, choirs, and the like.

Another object of this invention is to provide for an apparatus by which a played sharp, flat, or natural key is indicated to the student by simulated notes for his and the instructor's determination of the correctness of the student's play.

Another object of this invention is to provide an efficient and simplified circuitry corresponding to notes, and key signatures one of which being readily selectable thereby.

Another object of this invention is to provide for a novel, useful and efficient audio-visual teaching apparatus for beginning musical students and including features by which a choice of instruction accompanies use of the apparatus.

BRIEF DESCRIPTION OF THE DRAWING

FIG. 3 is a schematic diagram of electrical circuitry energizing light means cooperatively associated with simulated notes mounted on the musical staffs of the panel shown in FIG. 2.

FIG. 4 is a schematic diagram of electrical circuitry by which a key signature simulation is produced on the simulating panel.

FIG. 5 illustrates electrical circuitry utilizable for the chord (or major or minor modes) designator column included in the simulating panel, a contact switch mechanism utilizable with each key of a piano and by which closing of the contacts therein produces an illuminated or lighted note on the simulating panel, and electromagnet circuits for locking a key and keys in depressed or played position.

DESCRIPTION OF THE PREFERRED EMBODIMENT(S)

Figure 1:
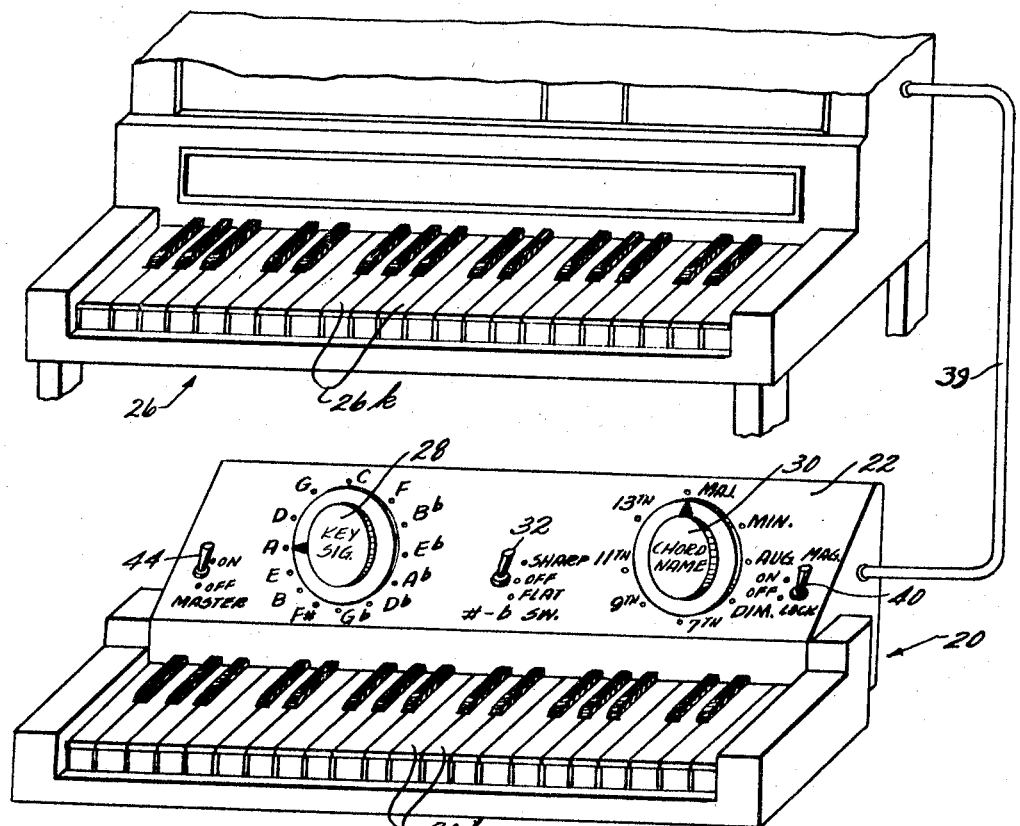
FIG. 1 is a perspective view of a student's keyboard, a master control board and an instructor's keyboard.

Referring now to the drawing in which reference characters correspond to like numerals in the following description, 20 (FIG. 1) represents an instructor's keyboard on top of which is mounted a master control board 22 for a visual simulator panel 24 (FIG. 2) preferably mounted atop a student's piano keyboard 26. Keyboards 20 and 26 are conventional and their respective keys 20k and 26k are independently operated from each other. Master control board 22 comprises a key signature (k.s.) selector 28, a chord designator (c.d.) selector 30 and a sharp-flat switch 32, all of which are properly connected to electrical circuits 36 and 38 illustrated in FIGS. 3, 4 and 5. Circuit 34, shown in FIG. 3, is illustrated as an example of a circuit connecting each key 20k and 26k to light means cooperatively associated with its respective simulating note on simulator panel 24, as will become apparent hereinafter. A circuit housing 39 gathers together what electrical wiring there is extending between control board 20, keys 20k and panel 24.

Also included on master control board 22 is a magnetic lock switch 40 by which magnetic locking means (FIG. 5), to be described later, is capable of locking each key, black or white, in played or down position, and a master on-off switch 44 for initially energizing the electrical system utilized in the apparatus.

Figure 2:
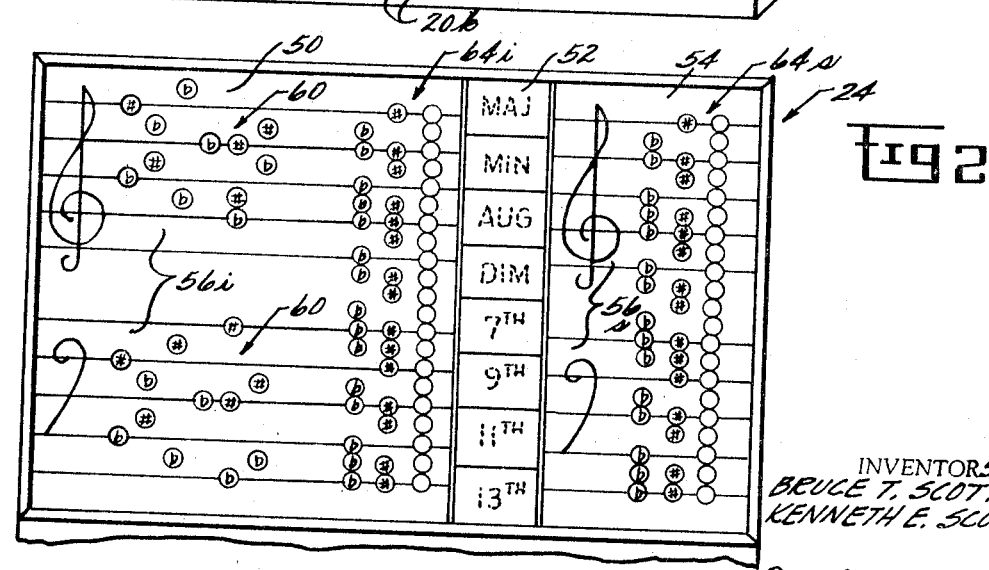
FIG. 2 is an elevational view of a simulating panel including musical staffs, notes, chord designations, and key signatures thereon.

Simulating panel 24 comprises an opaque substance divided into three sections—an instructor's section 50, a chord designator column 52, and a student's section 54. Musical staffs 56i and 56s are mounted, by suitable markings, on instructor and student sections 50, 54, respectively. Chord designator column 52 includes a list of markings constituting musical chords or modes, such as major chord, minor chord, modes, etc., customary abbreviations therefor being sufficient to identify each, as shown in FIG. 2.

In instructor's section 50, a group of symbols 60, each symbol being either a sharp or flat symbol, is displayed in proximate relation to the clefs of musical staff 56i. By means of k.s. selector 28, any set of symbols constituting a key signature can be distinguished, by illuminating means, from the remaining symbols in grouping 60, as will be more fully shown hereinafter. Thus, a particular key signature, illuminated, can be visually simulated in the instructor's section 50 by k.s. selector 28, thereby informing a musical student thereof.

In both sections 50 and 54, and disposed upon respective musical staffs 56i and 56s, sets 60i and 64s of notes and symbols therefor are each disposed on such staffs, respectively. Each set 64i, 64s comprises a plurality of natural notes in vertical alignment, each of which being properly superimposed on its space or line of musical staffs 56i and 56s. Immediately to the left of each of the plurality of natural notes, its sharp and flat symbols are disposed. Thus, as it will be shown, when a particular key or keys are played, its corresponding natural note, and sharp or flap symbol if necessary, is immediately simulated in set 64i or 64s on a musical staff in either the instructor's section 50 or the student's section 54, depending, of course, on which keyboard 20 or 26 the key or keys are played. This simulation includes the distinguishment of the key or keys played from the key or keys not played, as will become evident from the following description of the electrical circuit controlling such distinguishment.

An electrical circuit 34 for utilization with an octave of notes in sets 64i and 64s is illustrated in FIG. 3. It is a matter of mere duplication of this circuit for every other octave or portion thereof of keys in keyboards 20, 26, and thus, the following description for the set 64i will suffice for both sets and for multiple octaves of keys 20k, 26k in keyboards 20, 26.

A low voltage source 70 is provided for circuitry 34, as well as for the other circuitries, and comprises a plurality of parallel circuits, each parallel circuit representing means to illuminate, and thereby distinguish, one of the notes (and symbols, if necessary) in set 64i from others. A parallel circuit is energized when a key 20k corresponding thereto is played. As an example illustrating the operation of parallel circuits for all notes and their symbols in sets 64i, operation of the parallel circuits 72, 74, and 76 for notes C, C♯, and D♭, respectively, will be described. As a natural key, such as C, is depressed on keyboard 20, a switch 80 (FIGS. 3, 5) is closed thereby energizing circuit 72. A light means 82 in circuit 72 and fixedly mounted directly behind the corresponding not C in set 64i on musical staff 56i lights up. Note C in set 65i is simulated on panel 24 and is visually distinguished from other notes therein. For a sharp note to be simulated, sharp-flap switch 32 is set in its sharp position. Should a sharp key, such as C♯, be depressed, a contact 84 (FIGS. 3, 5) in parallel circuit 74 is closed thereby energizing circuit 74. At the same time, a relay solenoid 85 in a holding circuit 86 closes a switch 87 between circuits 74 and 72 thereby energizing circuit 72.

A light means 88 in circuit 74 and fixedly mounted directly behind the sharp symbol in set 64i and corresponding to natural note C on musical staff 56i together with light means 82 (for natural note C) lightup, thereby designating and visually distinguishing the C♯ note in set 64i.

Now suppose a flat note, such as D♭, is to be simulated in set 64i on panel 24. Sharp-flat switch 32 is set in its flat position shown in phantom. The key of D♭ being the same key as C♯ on keyboard 20, the parallel circuit 76 is energized by the closing of contact 84 (FIGS. 3, 5), and the circuit 74 (for natural note C and its sharp symbol) is not energized because of the flat position of sharp-flat switch 32 (i.e., circuit 74 is connected to the sharp position of switch 32). However, a relay solenoid 90 in a holding circuit 92 closes a switch 94 between circuit 76 and a parallel circuit 96 for natural note D. Thus, a light means 98 in circuit 76 and a light means 100 in circuit 96, each fixedly mounted directly behind the flat symbol corresponding to natural D and behind natural note D, respectively, on musical staff 56i light up. What is designated and visually distinguished on simulating panel 24 is such note D♭ in set 64i.

Thus, each individual note, representing a particular key on keyboard 20, in the set 64i is visually distinguished from keys not depressed on keyboard 20, and is specifically simulated in the teaching apparatus.

It should be understood that lights 82, 88, 98, 100, etc., may be employed directly in panel 24 and thereby represent the notes and symbols thereof per se on musical staffs 56i, 56s. However, the preferred embodiment includes a note-shaped transparent or translucent pane or open aperture being employed in panel 24 for the notes, and translucent panes with appropriate sharp or flat symbol markings therein, contrasted to the opaqueness of panel 24. Energization of a parallel circuit of circuitry 34 thus makes each note and its symbol, if necessary, corresponding to a played key clearly visible and distinguishable by illumination.

Electrical circuitry 36 is provided to simulate a particular key signature in the instructor's section 50 and on the upper or G-clef portion of musical staff 56i. It should be understood that it is a mere matter of duplication of the following described circuit in order to provide key signature simulation for the lower or base clef portion of musical staff 56i.

As background information, musical keys are developed one upon the next whereby the identifying key signature for each successively developed key has been increased by either one additional sharp or flat over that of the immediately previous musical key. The development of the key signatures results in the following scheme, showing sharps and flats in each developed key signature:

| Key | Key signature |
| --- | --- |
| C | — |
| G | F♯ |
| D | F♯ — C♯ |
| A | F♯ — C♯ — G♯ |
| E | F♯ — C♯ — G♯ — D♯ |
| B | F♯ — C♯ — G♯ — D♯ — A♯ |
| F♯ | F♯ — C♯ — G♯ — D♯ — A♯ — E♯ |
| C♯ | F♯ — C♯ — G♯ — D♯ — A♯ — E♯ — B♯ |
| F | B♭ |
| B♭ | B♭ — E♭ |
| E♭ | B♭ — E♭ — A♭ |
| A♭ | B♭ — E♭ — A♭ — D♭ |
| D♭ | B♭ — E♭ — A♭ — D♭ — G♭ |
| G♭ | B♭ — E♭ — A♭ — D♭ — G♭ — C♭ |

Consequently, circuitry 36 can be fashioned to reflect the addition of one light means 90 with each succeeding key signature developed and at the same time include previous light means 90 corresponding to the specific sharps or flats included in the previously developed key signatures. Each of light means 90 illustrated in FIG. 4 (the circles with sharp and flat identities set forth therein) corresponds to a symbol in group 60 immediately adjacent the G-clef on musical staff 56i in the instructor's section 50 of simulating panel 24, and is fixedly mounted directly behind such symbol. In addition to a parallel circuit for each light means 90, circuitry 36 includes a pair of arcuate contact surfaces 92, 94, each opopsed to the other in the manufacture of selector 28 and fixed thereto as shown in FIG. 4. Surface 92 maintains contact with a stationary lead 96 from voltage source 70 as it rotates counterclockwise to contact the lead of each parallel circuit by which key signatures involving sharps are simulated in grouping 60. Similarly, surface 94 maintains contact with a stationary lead 98 from voltage source 70 as it rotates clockwise to contact the lead of each parallel circuit by which key signatures involving flats are simulated in grouping 60. It should now be apparent that a rotation of selector 28 will in no way simulate a mixture of sharps and flats for a key signature in grouping 60.

The circuitry 36 of FIG. 4 may be duplicated for the symbols in grouping 60 in musical staff 56i appearing adjacent the base or treble clef. In particular, the parallel circuits including the light means 90 (associated with the sharp and flat symbols adjacent the G-clef in section 50) need merely to be duplicated, with their respective duplicated leads being coupled to their corresponding leads attached to selector 28 opposite surface contacts 92, 94.

FIG. 5 illustrates several circuits now to be described. Means such as switches 80 and 84 (FIG. 3, also) are provided for each black and white key 21, 23, respectively, of each octave in keyboards 20, 26, respectively, the depression or playing of which closes such switches and energizes their respective circuits shown in FIG. 3. For white key 21, switch 80 is mounted on the underside of a baseboard 100. A plunger 102, fixed to white key 21 and extending through baseboard 100 and in vertical alignment with switch 80, springs the contacts of switch 80 into closed position as the key is played. A fulcrum 104 is shown to represent a conventional pivotal element for white key 21.

For black key 23, switch 84 is mounted on a supporting structure 108 in the instrument and to the rear thereof whereby play of black key 23 about its conventional fulcrum 110 elevates a key rod 112 fixed thereto to spring close the contacts of switch 84, thereby energizing its respective circuit shown in FIG. 3.

Magnetic lock means, controllable by switch 40 on master control board 22 (FIG. 1) is provided for keyboard 20, should the instructor desire to retain simulation of played keys corresponding to set 64i for some time after such play, such as for emphasizing a particularly played note, chord, or the like. Magnetic lock means comprises an electromagnet 120 securely mounted to a side of baseboard 100 and in close proximity to a metallic contact 122 mounted on the underside of key 21. Metallic contact 122 is adapted to cooperate with the magnetic field developed as a result of energization of electromagnet 120 by closing of switch 40. It should be understood that closing of switch 40 in and of itself does not depress key 21. The strength of the field of electromagnet 120 is adjusted to a degree such that only after key 21 is manually depressed, with switch 40 closed, is metallic contact 122 held by the strength of such field. Opening of switch 40 cancels the magnetic field thereby releasing key 21 from remaining in its down position by itself.

A similar arrangement is provided for each black key 23, as shown in FIG. 5, by switch 41, electromagnet 126 mounted on supporting structure 108 and metallic contact 128 fixedly mounted at the rear of key 23, and although switches 40, 41 are shown in FIG. 5, the preferred embodiment envisages but one switch 40 as shown in FIG. 1, as it is obvious that the skill of the mechanic can provide a circuit having but one switch 40 for both electromagnets 120, 126. Two circuits for magnetic locking means for each key are shown in FIG. 5 to merely maintain clarity of illustration in the electrical circuitry of the drawing sheet.

Magnetic locking means may also be applied to keyboard 26 and its keys 26k in order to prolong a student's play during instructional lessons, say, for example, when the instructor desires to emphasize the correct or incorrect play of the student. A circuitry such as that described above may be used.

Keyboard 20 is preferably mute in connection with instructional play by a student on keyboard 26, thereby providing for ready audible and visual discernment by the instructor in the student's play.

If desired, a key signature simulation may be mounted in student section 54.

The operation of the device should now be apparent, and what has been described above may be read in conjunction with the following description, and likewise, the following description can be read with that described above. Switch 44 is turned on (although switch 44 is not illustrated in the electrical circuitry of FIGS. 3, 4, and 5, it is obvious to include same in the line leading from voltage source 70 to such circuitry), and selector 28 and/or selector 30 are set at particular key and chord positions. Corresponding signal means 90 for a specific key signature in grouping 60 is energized (illuminated) and such key signature is simulated in section 50 of simulating panel 24, being visually distinguished from all others. Likewise, the specific signal means associated with a chord designation in column 52 also illuminates, visually informing the student of the particular chord or mode involved in the musical instruction at a given moment. Sharp-flat switch 32 is normally set in sharp position. As keys 20k (21 and/ or 23) are played, their correAs keys 20k (21 and/or 23) are played, their corresponding switches 80, 84 close. Corresponding signal means 90 are energized (illuminated) and their corresponding notes and sharp symbols therefor (if sharp keys are played) are simulated in section 50. When a student plays, a key or keys 21 and/or 23, similarly, the corresponding notes thereto in section 54 are simulated. Should flat notes be involved in the musical instruction, switch 32 is flipped to its flat position. When flat keys are played, flat symbols in sets 64i, 64s are corresponding simulated with their corresponding natural note in such sets.

We claim:
1. A musical simulating instructional apparatus comprising in combination,
    a master control board including a key signature selector,
    a keyboard having a set of playable keys by an instructor,
    a second keyboard having a corresponding set of keys playable by a student,
    a musical simulating panel having an instructor's section and a student's section mounted thereon,
    each said section comprising a musical staff and a set of notes on said staff, and a sharp and flat symbol in musical arrangement association with and corresponding to each of said notes,
    a grouping of key signature symbols mounted on said musical staff in said instructor's section,
    signal means for each note and its corresponding sharp and flat symbol in said set of notes,
    a second signal means for each key signature in said grouping, said first and second signal means being respectively cooperatively connected with each note, symbol therefor, and said key signature symbol,
    first electrical circuitry means for energizing a signal means for a particular note, sharp and symbol therefor upon play of a key in said keyboard and second keyboard, the corresponding note for such key being simulated in its corresponding section in said panel, and
    a second electrical circuitry means for energizing a signal means for a particular key signature selected by said selector, the corresponding key signature on said panel being simulated thereby.

2. The apparatus of claim 1 including
a chord designator column on said panel,
a chord designator selector mounted on said control board for selecting a particular chord designation, and
a third electrical circuitry means including signal means connecting said selector to said column,
whereby a particular chord designation is distinguished on said column.

3. The apparatus of claim 2 including magnetic locking means for each key on said second keyboard whereby upon play of the key, the key is retained in its play position, with its corresponding simulation by note upon said panel.

4. The apparatus of claim 1 including magnetic locking means for each key on said second keyboard whereby upon play of the key, the key is retained in its play position, with its corresponding simulation by note upon said panel.

5. In combination, a musical simulating panel, a master control board therefor and electrical circuitry for simulating notes, symbols therefor and a key signature thereon,
said panel comprising an instructor's section, a student's section, each said section comprising a musical staff, and a set of notes on said staff, a sharp and flat symbol in musical arrangement association with and corresponding to each of said notes, and a grouping of key signature symbols mounted at least in said instructor's section,
said control board comprising a key signature selector,
said electrical circuitry comprising a circuit for connecting a key of a keyboard in its played position to a signal means in said circuit cooperatively connected with its corresponding note in said set of notes thereby simulating the note on said panel, a second circuit for connecting a position of said selector to a signal means in said second circuit cooperatively connected with its corresponding key signature in said grouping thereby simulating a particular key signature,
whereby notes, symbols therefor, and a key signature is simulated on said panel upon closing of said circuits, such simulation occurring in the respective sections corresponding to the keyboard on which the played key is mounted.

6. The combination of claim 5 including
a chord designator column on said panel,
a chord designator selector mounted on said control board for selecting a particular chord designation, and
a third electrical circuitry means including signal means connecting said selector to said column,
whereby a particular chord designation is distinguished on said column.

References Cited

UNITED STATES PATENTS

| | | | |
|---|---|---|---|
| 1,696,901 | 1/1929 | Bostelman | 84—478 |
| 1,889,418 | 11/1932 | Pierce | 84—478 |
| 3,395,461 | 8/1968 | Krause | 84—478 |

FOREIGN PATENTS 539,987   10/1941   Great Britain.

RICHARD B. WILKINSON, *Primary Examiner.*

LAWRENCE R. FRANKLIN, *Assistant Examiner.*

UNITED STATES PATENT OFFICE
CERTIFICATE OF CORRECTION

Patent No. 3,446,109

May 27, 1969

Bruce T. Scott et al.

It is certified that error appears in the above identified patent and that said Letters Patent are hereby corrected as shown below:

Column 6, line 66, before "first" insert -- a --. Column 7, line 26, "staff,", first occurrence, should read -- staff --.

Signed and sealed this 21st day of April 1970.

(SEAL)
Attest:

Edward M. Fletcher, Jr.
Attesting Officer

WILLIAM E. SCHUYLER, JR.
Commissioner of Patents